UNITED STATES PATENT OFFICE.

LÉON VIDAL, OF MARSEILLES, FRANCE.

IMPROVEMENT IN THE PROCESSES OF PRODUCING PHOTOCHROMIC PRINTS.

Specification forming part of Letters Patent No. 178,210, dated May 30, 1876; application filed June 11, 1875.

*To all whom it may concern:*

Be it known that I, LÉON VIDAL, of Marseilles, in the Republic of France, have invented an Improved Process of Producing Photochromic Prints; and I do hereby declare that the following is a full, clear, and exact description of the same.

This invention relates to an improved process of producing pictures in different colors by the direct action of the light alone, or in conjunction with mechanical means; and it consists in producing upon gelatine films, in a manner similar or analogous to the production of carbon pictures, a series of partial pictures in the color appropriate to the portion of the finished picture which such partial picture is to represent, and afterward mounting said partial pictures, one over the other in proper order, on a suitable supporting-surface, the partial pictures being properly registered, so as to fall in the proper relative positions in the finished picture.

In carrying out my invention I produce a series of negatives equal in number to the colors to be represented in the finished picture, and carefully stop out all portions of the same, with any opaque coloring matter, that are to be left without color in the partial picture to be produced from such negative. Say, for instance, that the partial picture to be thus produced is to represent the yellow portions of the finished pictures, the portions of the negative representing all the other parts of the finished picture are stopped out, and a partial picture is produced upon a gelatine film prepared with a yellow-body color; similar to the production of the ordinary carbon pictures. Upon the development of the picture a partial picture, with properly-graduated lights and shades, will be left upon the gelatine film in monochrome or a single color, which, in the instance just illustrated, would be yellow. The prepared gelatine film, during the production of the picture, must be secured upon a proper supporting-surface, which may consist of a greased or other suitably prepared sheet of paper, or plate of metal or glass, and after the production of the picture the film is removed by washing it off. The portions of the gelatine film not acted upon by the light will remain transparent or translucent, so that the colors, when the films are arranged in proper order, will show through such portions. The remaining partial pictures are prepared in the same manner, and when the full number is produced they are removed from their supporting-plates and mounted in proper order, one upon another, until the whole picture is completed.

The various partial pictures thus formed are marked by the action of the light, so as to properly register, by means of suitable marks on the original negatives, and, previous to mounting them one upon the other, are cleansed from the greasy material by washing in benzine.

It is evident that the ground portions of the picture may be produced by mechanical means, such as chromo-lithography or otherwise, and combine with a series of partial pictures prepared as above described, and that the partial pictures may be mounted upon a transparent medium, or simply combined without mounting upon any supporting material, so as to serve as polychromic transparencies, to be viewed by transmitted light.

What I claim, and desire to secure by Letters Patent, is—

The process of producing photographic pictures in various colors, by producing a series of partial pictures in single colors by the direct action of light alone, or in conjunction with mechanical means, and mounting such pictures one above another upon a suitable supporting-surface, substantially as described.

LÉON VIDAL.

Witnesses:
 CH. DEMAILLE,
 J. V. CÉVINNE.